US012218367B2

(12) United States Patent
Li et al.

(10) Patent No.: US 12,218,367 B2
(45) Date of Patent: Feb. 4, 2025

(54) DEVICE AND BATTERY MODULE WITH INTEGRATED BACKUP RADIO

(71) Applicant: ZEBRA TECHNOLOGIES CORPORATION, Lincolnshire, IL (US)

(72) Inventors: Sichong Li, North York (CA); Irfan Kadri, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 241 days.

(21) Appl. No.: 17/231,699

(22) Filed: Apr. 15, 2021

(65) Prior Publication Data

US 2022/0336901 A1 Oct. 20, 2022

(51) Int. Cl.
*H01M 50/213* (2021.01)
*H04W 4/10* (2009.01)
*H04W 4/80* (2018.01)

(52) U.S. Cl.
CPC ........... *H01M 50/213* (2021.01); *H04W 4/10* (2013.01); *H04W 4/80* (2018.02)

(58) Field of Classification Search
CPC ........ H01M 50/213; H04W 4/80; H04W 4/10
See application file for complete search history.

(56) References Cited

U.S. PATENT DOCUMENTS 6,178,311 B1 * 1/2001 Pance .................. H05K 1/0218
333/204
7,859,469 B1 * 12/2010 Rosener .................. H01Q 1/22
343/702
10,069,191 B1 * 9/2018 Stieber ................. H04B 1/3883
10,511,183 B2 * 12/2019 Pan .......................... H02J 50/80
2002/0111189 A1 8/2002 Chou
2007/0247136 A1 10/2007 Wallmark et al.
2010/0216522 A1 8/2010 Bennis et al.
2010/0282852 A1 11/2010 Koenck et al.
2013/0143100 A1 * 6/2013 Bennis .............. H04W 52/0296
429/156
2014/0015727 A1 1/2014 Hong et al.

FOREIGN PATENT DOCUMENTS

JP 2001056894 A * 2/2001

OTHER PUBLICATIONS

Machine translation of JP2001056894A (Year: 2023).*
International Search Report and Written Opinion for International Application No. PCT/US2022/016908 mailed on May 3, 2022.
Jain et al. "wildCENSE: GPS based animal tracking system." 2008 International Conference on Intelligent Sensors, Sensors Networks and Information Processing. ICC, 2000. Dec. 18, 2008 (Dec. 18, 2008) Retrieved on Apr. 10, 2022 (Apr. 10, 2022) from <https://ieeexplore.ieee.org/abstract/document/4762058> entire document.

* cited by examiner

*Primary Examiner* — Nicholas P D'Aniello
*Assistant Examiner* — Albert Michael Hilton

(57) ABSTRACT

An example mobile computing device includes: a battery module including a battery cell having a conductive casing; a coupler; and a controller coupled to the coupler, the controller configured to communicate a broadcast signal to the coupler, the coupler radiating the broadcast signal to the conductive casing of the battery module and causing the conductive casing of the battery module to transmit the broadcast signal from the mobile device.

19 Claims, 4 Drawing Sheets

DEVICE AND BATTERY MODULE WITH INTEGRATED BACKUP RADIO

BACKGROUND

Mobile computing devices may include radios to broadcast signals to advertise their presence and provide a means for locating them when they are lost. These radios may be low-energy radios distinct from a main radio or communications interface to enable them to operate when the mobile computing device is low on batteries. However, implementing an additional radio may require structural changes to the mobile computing device and be costly to implement.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
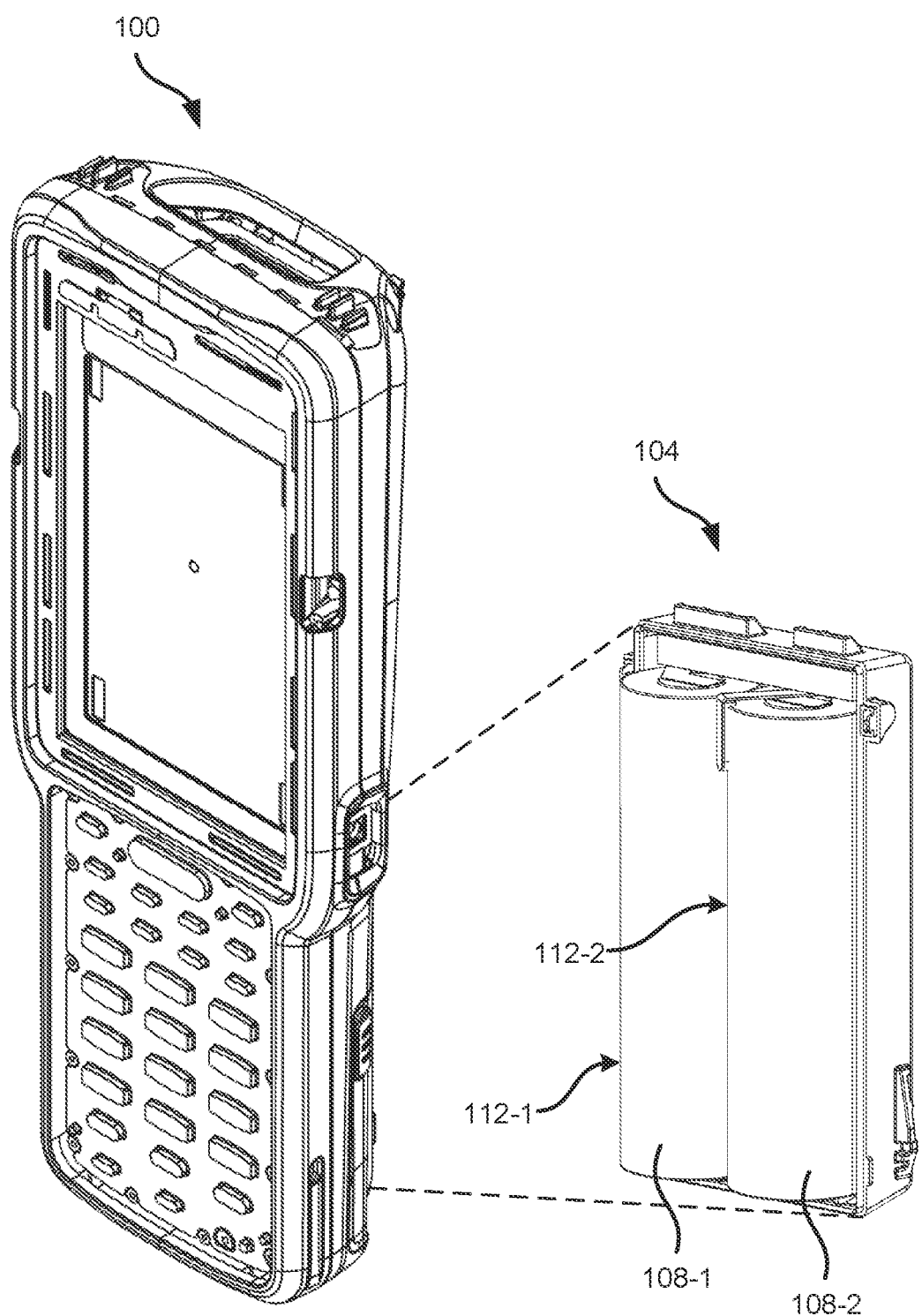
FIG. 1 is an isometric view of a mobile computing device and battery module.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device comprising: a battery module including a battery cell having a conductive casing; a coupler; and a controller coupled to the coupler, the controller configured to: communicate a broadcast signal to the coupler, the coupler radiating the broadcast signal to the conductive casing of the battery module and causing the conductive casing of the battery module to transmit the broadcast signal from the mobile device.

Additional examples disclosed herein are directed to a battery module for a mobile computing device comprising: a battery cell including a conductive casing; a coupler; and a controller coupled to the coupler, the controller configured to: communicate a broadcast signal to the coupler, the coupler radiating the broadcast signal to the conductive casing of the battery cell and causing the conductive casing of the battery cell to transmit the broadcast signal.

Additional examples disclosed herein are directed to a radio integrated with a battery module, the radio comprising: a coupler configured to excite a conductive casing of a battery cell of the battery module; and a controller coupled to the coupler, the controller configured to communicate a broadcast signal to the coupler, the coupler radiating the broadcast signal to the conductive casing of the battery cell and causing the conductive casing of the battery to transmit the broadcast signal from the radio.

FIG. 1 depicts a mobile computing device 100 including a battery-integrated backup radio. The mobile computing device 100 is a mobile computing device such as a mobile phone, handheld computer, barcode scanner, tablet, or the like.

The mobile computing device 100 includes a battery module 104 to power the mobile computing device 100, and as will be described in further detail below, includes an integrated backup radio for the mobile computing device 100. The battery module 104 includes battery cells 108 including electrochemical components to provide electric power to the mobile computing device. In the present example, the battery module 104 includes two battery cells 108-1 and 108-2 (referred to generically as a battery cell 108-1 and collectively as battery cells 108). The battery cells 108 include conductive casings 112-1, 112-2 to encase the electrochemical components of the cell. As will be appreciated, in other examples, the battery module 104 may include more than two or fewer than two battery cells 108.

The mobile computing device 100 may further include other components such as input/output devices (e.g., keypads, touch-sensitive displays, speakers and the like), processors, communications interfaces, and the like to control the regular operation of the mobile computing device 100. During regular operation, the components of the mobile computing device 100 may draw power from the battery module 104. However, when the battery module 104 is low on power, such components, including the communications interface, may be shut down to preserve battery. Accordingly, the mobile computing device 100 includes the backup radio to send signals to help users locate the mobile computing device 100. The backup radio may therefore be implemented independently from the system on a chip carrying the main radio and controller and the backup radio may therefore be operated even with no power. In particular, the backup radio preferably employs a low-energy communications protocol, such as Bluetooth low energy (BLE). However, radios require space within the mobile computing device 100 and hence implementation of a separate backup radio may require structural changes to the mobile computing device 100 and hence be costly to implement.

Figure 2:
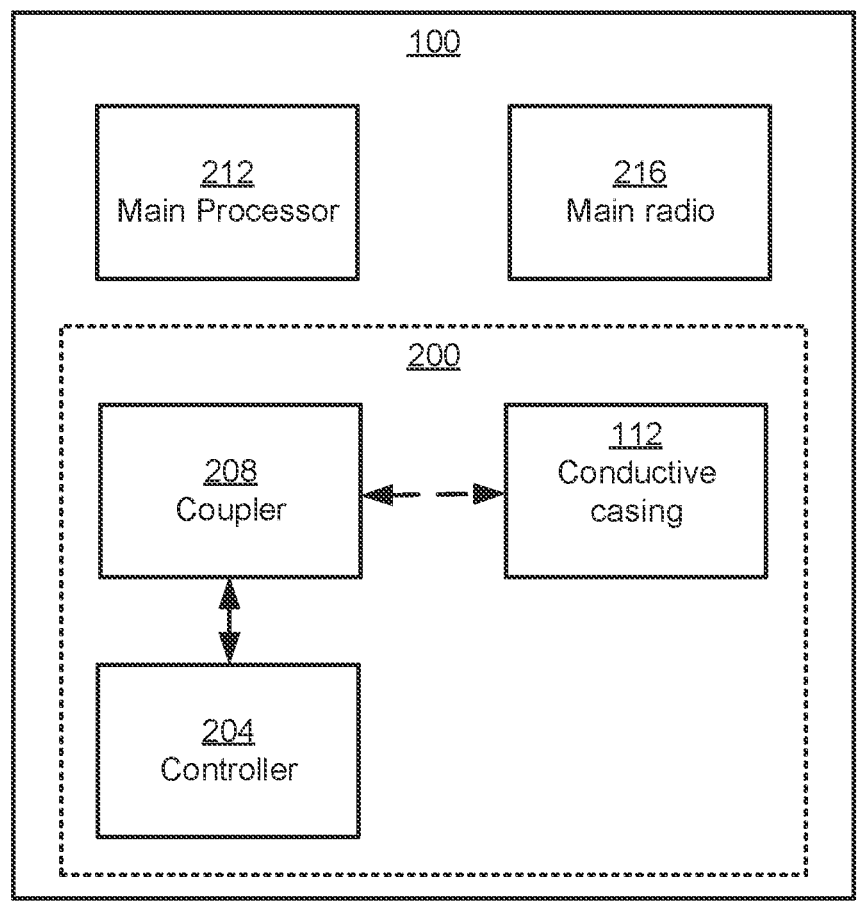
FIG. 2 is a block diagram of a backup radio for the mobile computing device of FIG. 1.

Accordingly, with reference to FIG. 2, the mobile computing device 100 includes a backup radio 200 which may be integrated with the battery module 104. In particular, the mobile computing device further includes a controller 204 and a coupler 208. Together, the controller 204, the coupler 208, and the conductive casing 112 form the radio 200. Specifically, the radio 200 is configured to employ the conductive casing 112 of the battery cells 108 as an antenna to broadcast signals. The radio 200 may exist in addition to and independently of a main processor 212 and a main radio 216 used for regular operation. That is, the radio 200 may be a secondary means of communication for use, for example, when the mobile computing device 100 is low on battery.

The controller 204 is configured to control the radio 200 to transmit signals, for example during a discovery operation of the mobile computing device 100 to enable the mobile computing device 100 to be discovered when it is lost. The controller 204 may be, for example, a processor interconnected with a non-transitory computer-readable storage medium, such as a memory, storing computer-readable instructions for execution by the processor. In particular, execution of the instructions may configure the controller 204 to perform various functions discussed below in greater detail and related to the control of the radio 200. The controller 204 may be implemented by one or more specially designed hardware or firmware components, such as a field-programmable gate array (FPGA), application-specific integrated circuit (ASIC), or the like. In some examples, the radio 200 may be configured to both transmit and receive signals, and hence the controller 204 may additionally be configured to process signals received at the conductive casings 112 acting as the antenna of the radio 200.

In some examples, such as when the radio 200 is intended to be implemented as a backup radio when the mobile computing device 100 is low on battery, the controller 204 may be a Bluetooth low energy controller or may be otherwise configured to implement a low-energy wireless communications protocol. In other examples, the controller 204 may be a WiFi controller configured to implement 2.4 GHz WiFi, 5 GHz WiFi, or other suitable communications protocols. In yet another embodiment, the controller 204 is a Radio Frequency Identification (RFID) controller configured to communicate an RFID broadcast signal. Alternatively or in addition, the controller 204 may implement a plurality of communications protocols and select one of the plurality of protocols based on the remaining battery level.

The coupler 208 is electrically coupled to the controller 204 and is an antenna specifically configured to excite the casings 112 and cause the casings 112 to radiate, thereby allowing the casings 112 to be used as a broadcast antenna for the radio 200. The selection of the specific design for the coupler 208 to optimize the radiation pattern of the casings 112 will be described in further detail below. The coupler 208 allows the radio 200 to be integrated with the battery module 104, by enabling the existing structural components of the battery module 104 (i.e., the conductive casings 112 of the battery cells 108) to be used as part of the radio 200.

The casings 112 of the battery cells 108 are generally formed from a conductive metal material and hence establish a suitable base for an antenna. In some examples, in addition to the casings 112 of the battery cells 108, additional components of the battery module 104, such as a housing or a portion of the housing for the battery cells 108, may also be conductive and therefore be excited by the coupler 208 to act as a broadcast antenna for the radio 200. The coupler design (e.g., coupler radiation pattern) may be selected to optimize the overall resulting radiation pattern of the combination of conductive components of the battery module 104. For example, the coupler design or layout may be selected to increase overall gain with a substantially omnidirectional radiation pattern. In particular, an omnidirectional radiation pattern may be beneficial for radiating signals from a lost device to allow other devices to find the lost device. In other examples, the coupler design or layout may be selected to increase gain in a particular direction or directions with respect to the plane of the mobile computing device 100, in accordance with other applications of the battery-integrated radio 200.

The main processor 212 may be a central processing unit, a plurality of cooperating processors, or the like configured to control the functions of the mobile computing device 100 (e.g., scanning and processing functions of a barcode scanner, display and processing functions of a mobile computer, and the like). The main radio 216 may be any suitable radio or communications interface. In particularly, the main processor 212 and the main radio 216 may draw power from the battery module 104 and hence be inoperable when battery power from the battery module 104 is cut off, when the amount of energy stored in the battery module 104 is below a threshold level.

Figure 3:
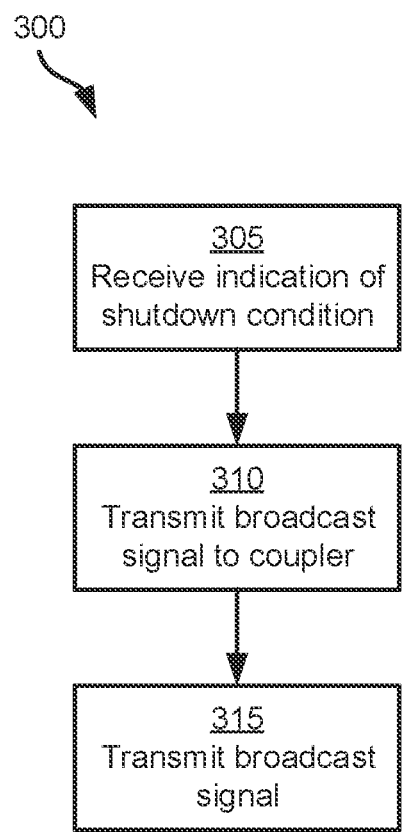
FIG. 3 is a method of using the backup radio of FIG. 2.

Referring to FIG. 3, an example method 300 of broadcasting a signal from the backup radio 200. The method 300 will be described in conjunction with its performance in the mobile computing device 100, however in other examples, the method 300 may be performed by other suitable devices.

The method 300 may be initiated, in some examples, at block 305. At block 305, the controller 204 may receive an indication of a shutdown condition of the mobile computing device 100. For example, if the mobile computing device 100 reaches a 4% battery level (or other suitable threshold), it may power off to conserve the remaining battery for a discovery operation to allow the mobile computing device 100 to be found (e.g. in the event that the device 100 is lost). In response to detection of the shutdown condition of the mobile computing device 100, the controller 204 may be configured to initiate the backup radio 200. In other examples, the method 300 may skip block 305 and proceed directly to block 310.

At block 310, the controller 204 transmits a broadcast signal to the coupler 208. Upon receiving the broadcast signal, the coupler 208 may begin to radiate and excites the casings 112 and, as applicable, other conductive components of the battery module 104. In particular, the coupler 208 radiates the broadcast signal to the conductive casings 112 of the battery module 104. The broadcast signal may be configured in accordance with the communications protocol implemented by the controller 204.

At block 315, in response to being excited by the coupler 208, the conductive casings 112 may radiate and broadcast the broadcast signal. Thus, in operation, the controller 204 may continue to iterate through blocks 310 and 315 and transmit suitable broadcast signals to the coupler 208 to cause the conductive casings 112 to transmit the broadcast signals from the mobile device 100. The broadcast signal may be formatted in accordance with a BLE protocols, RFID protocols, WiFi protocols, or the like, in accordance with the communications protocol implemented by the controller 204. The broadcast signal may correspond, for example, to a lost device signal and include information for a user operating another device to locate the mobile computing device 100. For example, the lost device signal may include an identifier of the mobile computing device 100, a last known location (e.g., if the mobile computing device 100 is normally capable of determining its location), a remaining battery or power level, or the like.

As will be appreciated, the use of conductive components of the battery module 104 allows the backup radio 200 to operate with a sufficient range while reducing structural changes required for implementation of the backup radio 200 in the mobile computing device 100. For example, the backup radio 200 may be optimized to have higher gain along selected vectors such that the radiation pattern remains substantially omnidirectional, and additionally allows the signal to be broadcast far along the selected vectors. In some examples, in addition to integrating the radio 200 into the battery module 104 via use of the conductive casings 112 as an antenna, the controller 204 and the coupler 208 are integrated into the battery module 104 as well.

Figure 4:
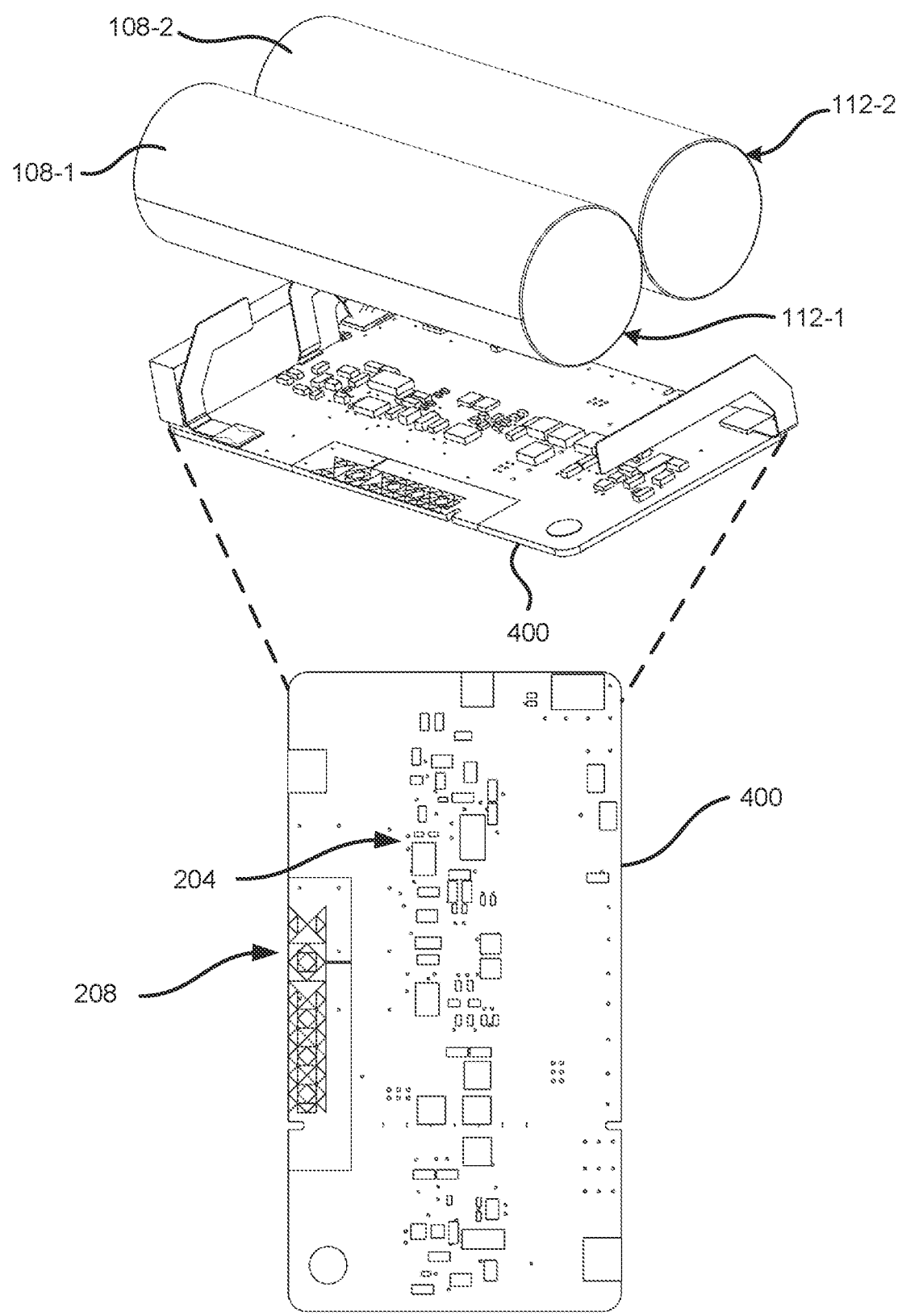
FIG. 4 is an exploded view of the backup radio of FIG. 2 integrated into the battery module of FIG. 1.

In particular, with reference to FIG. 4, an exploded view of the battery module 104 of the mobile computing device 100 is depicted. In addition to the battery cells 108, the battery module 104 may further include a printed circuit board 400. The battery module 104 may additionally include a housing (not shown) configured to house the battery cells 108 in their conductive casings 112 as well as the printed circuit board 400.

The printed circuit board 400 may include components required for the normal operation of the battery module 104 to supply electrical power to connected modules (e.g., the other internal components of the mobile computing device 100). For example, the printed circuit board 400 may support electrical contacts for the battery cells, as well as circuitry for the control and power management of the battery module 104. Additionally, to integrate the radio 200 into the battery module 104, the printed circuit board 400 may further be configured to support the controller 204 as well as the coupler 208. The printed circuit board 400 may therefore act as a ground plane for the coupler 208.

FIG. 4 additionally depicts a front view of the printed circuit board 400 including the controller 204 and the coupler 208. As can be seen from the front view, the printed circuit board 400 includes a feed trace connecting the controller 204 to the coupler 208. The coupler 208 itself may include at least one trace etched into the printed circuit board 400. For example, in the presently illustrated example, the coupler 208 includes a series of triangular traces etched into the printed circuit board 400 and extending along a portion of a length of the printed circuit board 400 and the battery cells 108. This exemplary layout of the coupler 208 is selected to optimize the radiation pattern emitted by the conductive casing 112 based on the physical configuration of the battery module 104 and the mobile computing device 100. For example, the radiation pattern may be affected by the size, shape, and number of battery cells 108 as well as the nearby presence of other components of the mobile computing device 100.

Accordingly, in other examples, the coupler 208 may have a different design, including one or more of a different size, shape, and location on the printed circuit board 400 to optimize the radiation pattern of the conductive casings 112 based on the number, shape and size of the battery cells 108, or to accommodate shape or size limitations of the printed circuit board 400. In some examples, the radio 200 may include multiple couplers configured to form a phased array and cooperate to excite the conductive casings 112.

For example, the layout or design of the coupler 208 may be determined empirically. For example, a user may select a starting design for the coupler 208 and simulate a radiation pattern for the radio 200 based on the known parameters of the mobile computing device 100 (i.e., the number, shape and size of the battery cells 108 and the size of the printed circuit board 400). If the radiation pattern satisfies a threshold condition (based, for example, on the shape of the radiation pattern), a prototype of the radio 200 may be developed. In some examples, several starting layouts may be selected and simulated, and the design producing the best simulated radiation pattern(s) may be selected for developing a prototype.

The prototype may include the integration of the radio 200 into the battery module 104 by etching the coupler 208 according to the selected layout(s) and integrating the controller 204 into the printed circuit board 400. The prototype battery-integrated radio may then be tested with the mobile computing device 100 to determine the resulting radiation pattern in the presence of the other components of the mobile computing device 100. If the resulting radiation pattern satisfies another threshold condition, the corresponding coupler layout may be selected to implement the coupler 208. For example, the threshold condition may be based on the shape of the resulting radiation pattern (e.g., substantially omnidirectional, or optimized to a single direction, based on the application of the radio 200), and the actual gain achieved when implemented in the prototype.

In some examples, some or all of the steps for selecting the layout and corresponding radiation pattern for the coupler 208 may be automatically performed by a computing device based on the parameters and physical configuration of the mobile computing device 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
    a battery module removable from the mobile computing device, the battery module including:
        a battery cell having a conductive casing;
        a coupler; and
        a controller coupled to the coupler, the controller configured to:
            communicate a broadcast signal to the coupler, the coupler radiating the broadcast signal to the conductive casing of the battery cell and causing the conductive casing of the battery cell to transmit the broadcast signal from the battery module.

2. The mobile computing device of claim 1, wherein the coupler comprises at least one trace etched into a printed circuit board of the battery module.

3. The mobile computing device of claim 2, wherein the controller is disposed on the printed circuit board of the battery module.

4. The mobile computing device of claim 2, wherein a layout of the coupler is selected based on one or more of: a size of the printed circuit board, a size of the battery cell and a shape of the battery cell to optimize a radiation pattern of the conductive casing.

5. The mobile computing device of claim 1, wherein the conductive casing, the coupler and the controller form a backup radio for the mobile computing device, and wherein the controller is configured to initiate the backup radio in response to a shutdown condition of the mobile computing device.

6. The mobile computing device of claim 1, wherein the controller comprises a Bluetooth low energy controller.

7. The mobile computing device of claim 1, wherein the controller comprises a WiFi controller.

8. A battery module for a mobile computing device, the battery module comprising:
    a battery module housing removeable from the mobile computing device, the battery module housing including:
        a battery cell including a conductive casing;
        a coupler; and
        a controller coupled to the coupler, the controller configured to:
            communicate a broadcast signal to the coupler, the coupler radiating the broadcast signal to the conductive casing of the battery cell and causing the conductive casing of the battery cell to transmit the broadcast signal.

9. The battery module of claim 8, further comprising a printed circuit board configured to support the coupler and the controller.

10. The battery module of claim 9, wherein the coupler comprises at least one trace etched into the printed circuit board.

11. The battery module of claim 9, wherein a layout of the coupler is selected based on one or more of: a size of the printed circuit board, a size of the battery cell, and a shape of the battery cell, to optimize a radiation pattern of the conductive casing.

12. The battery module of claim 8, wherein the controller comprises a Bluetooth low energy controller.

13. The battery module of claim 8, wherein the controller comprises a WiFi controller.

14. A radio integrated within a battery module, the radio comprising:
    a coupler configured to excite a conductive casing of a battery cell of the battery module; and
    a controller coupled to the coupler, the controller configured to communicate a broadcast signal to the coupler, the coupler radiating the broadcast signal to the conductive casing of the battery cell and causing the conductive casing of the battery to transmit the broadcast signal from the radio.

15. The radio of claim 14, wherein the coupler and the controller are disposed on a printed circuit board of the battery module.

16. The radio of claim 15, wherein the coupler comprises at least one trace etched into the printed circuit board.

17. The radio of claim 15, wherein a layout of the coupler is selected based on one or more of: a size of the printed circuit board, a size of the battery cell, and a shape of the battery cell, to optimize a radiation pattern of the conductive casing.

18. The radio of claim 14, wherein the controller comprises a Bluetooth low energy controller.

19. The radio of claim 14, wherein the controller comprises a WiFi controller.

* * * * *